United States Patent Office 3,482,604
Patented Dec. 9, 1969

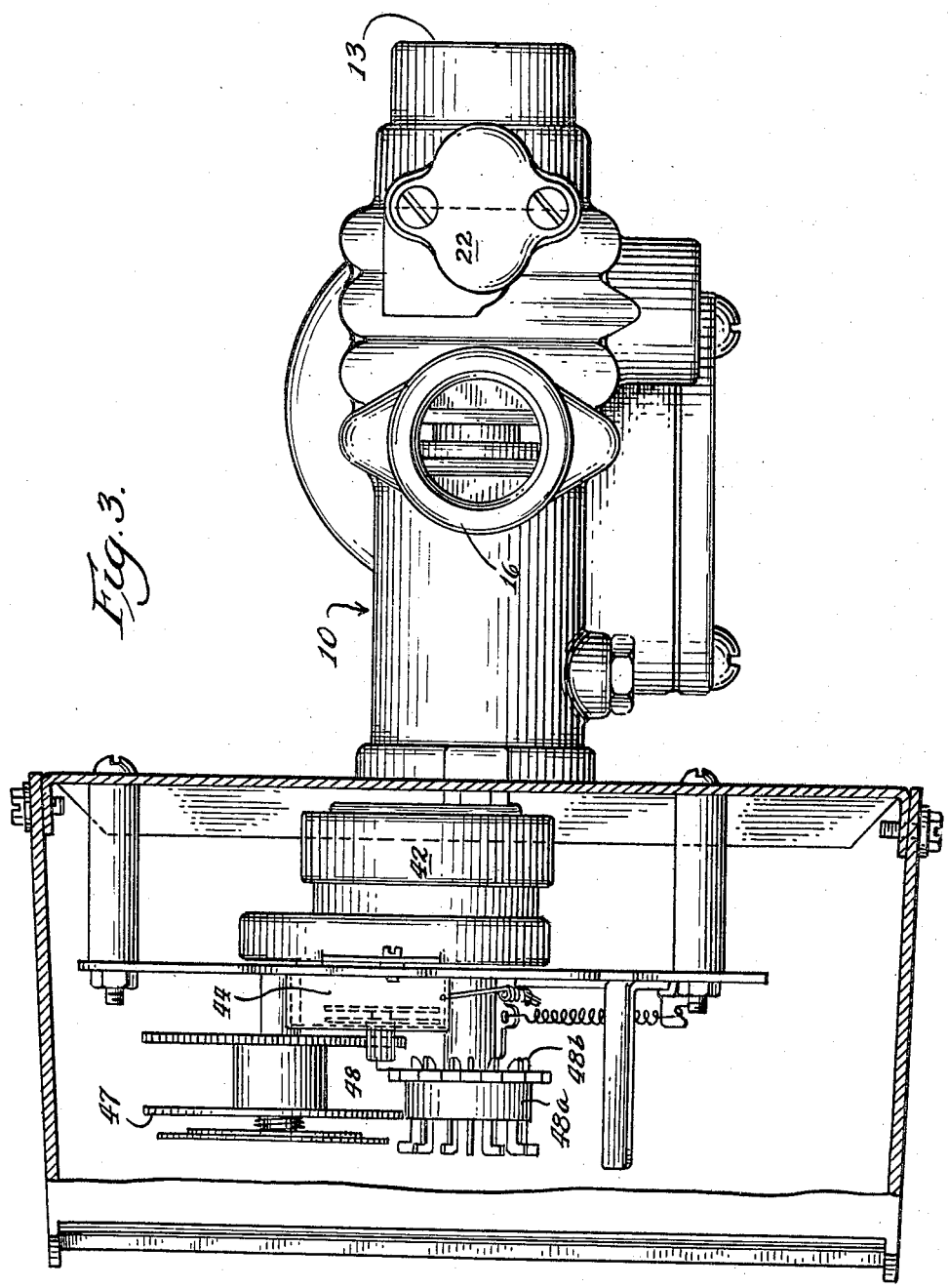

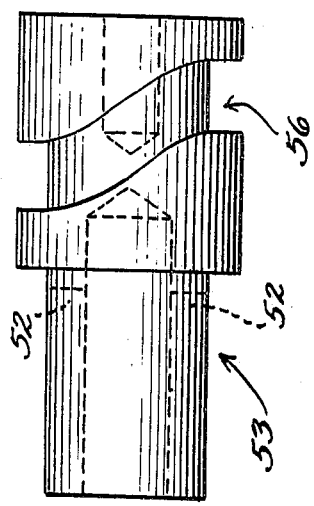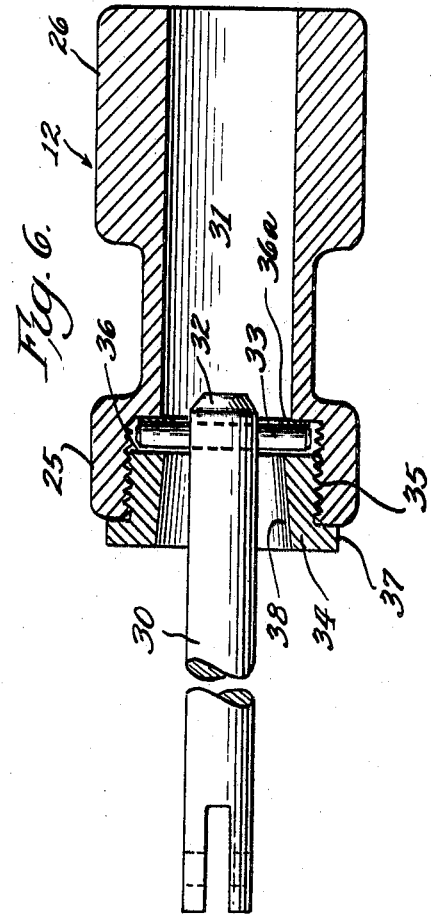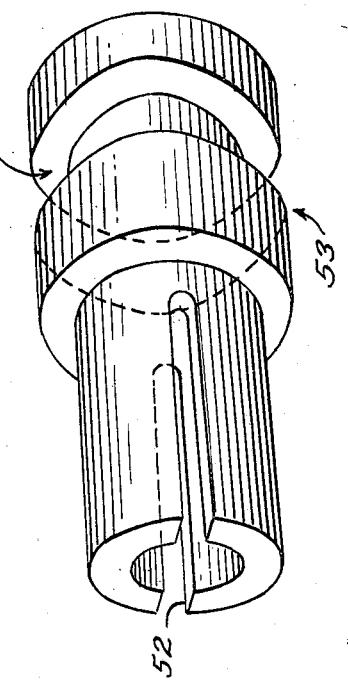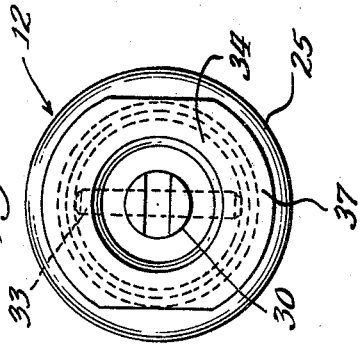
Inventors
Lambert W. Fleckenstein
Andrew J. Fleckenstein.
By Mann, Brown & McWilliams.
Attys.

3,482,604
CONTROL VALVE WITH ROTARY ACTUATION
Lambert W. Fleckenstein, 4445 N. 135th St., and Andrew J. Fleckenstein, 13650 Squirrel Drive, both of Brookfield, Wis. 53005
Filed Feb. 21, 1966, Ser. No. 529,027
Int. Cl. G05b *19/06;* G04c *23/26*
U.S. Cl. 137—624.2                2 Claims

ABSTRACT OF THE DISCLOSURE

A piston type water softener valve with a pin loosely connected between the piston rod and piston to enable the piston to tilt relative to the rod and rotate relative to the same. The piston is driven by a drive translating rotary movement of a timing motor into reciprocating movement of the piston.

---

The present invention is directed to new and useful improvements in piston-type valves, particularly the type used for water softening apparatus.

In the past, automatic water softening valves have characteristically included some timing means for automatically causing operation of one or more valves for the various valve positions of normal service, regeneration, backwashing, and sometimes with a particular rapid rinse position. Piston-type valves used with such automatic apparatus characteristically use a timing motor or other timing means which is used to periodically energize a valve operating motor to shift the valve mechanism to and from the various positions required for the regeneration cycle and the normal service operation. Typical arrangements of this type in use during the past several years include a timing motor which has a set of cams or the like to energize the circuit for the valve drive motor at appropriate times and for the correct time periods. In some cases, as in Rosten et al. Patent Number 2,906,332 three separate motors are employed for the various functions of timing and valve operation. With the foregoing in mind, one of the purposes of the present invention is to so arrange a piston-type control valve which may be used with water softening apparatus in such a manner that the valve is directly driven from the timing motor, thus eliminating the need for a separate motor in the overall system. A related purpose is to provide a new and efficient mechanism for mechanically and periodically translating motion of the timing motor into movement of the movable member of the control valve for the proper regeneration sequence of the valve.

Another purpose of the present invention is to simplify the assembly of a piston, valve body, and piston rod in a piston type valve, while so arranging the same that relatively small operating forces are required to actuate the piston and move it to its various operating positions.

Another purpose of the present invention is to provide a new and improved piston and piston rod connection which not only simplifies assembly of the piston and piston rod, but also reduces wear and corrosive effects on the connection which are due to flow of fluid through the valve.

These and other purposes of the invention will be more apparent in the course of the ensuing specification and claims when taken with the accompanying drawings, in which:

FIGURE 3 is a top view of FIGURE 1;

FIGURE 4 is a perspective view of a drive element utilized in the assembly of FIGURE 1;

FIGURE 5 is a plan view of a portion of the drive assembly illustrated in FIGURE 1, while particularly illustrating the element shown in FIGURE 4;

FIGURE 6 is a sectional illustration of the piston and piston rod connection illustrated in FIGURE 1;

FIGURE 7 is an end view of the piston and piston rod connection illustrated in FIGURE 6.

Figure 1:
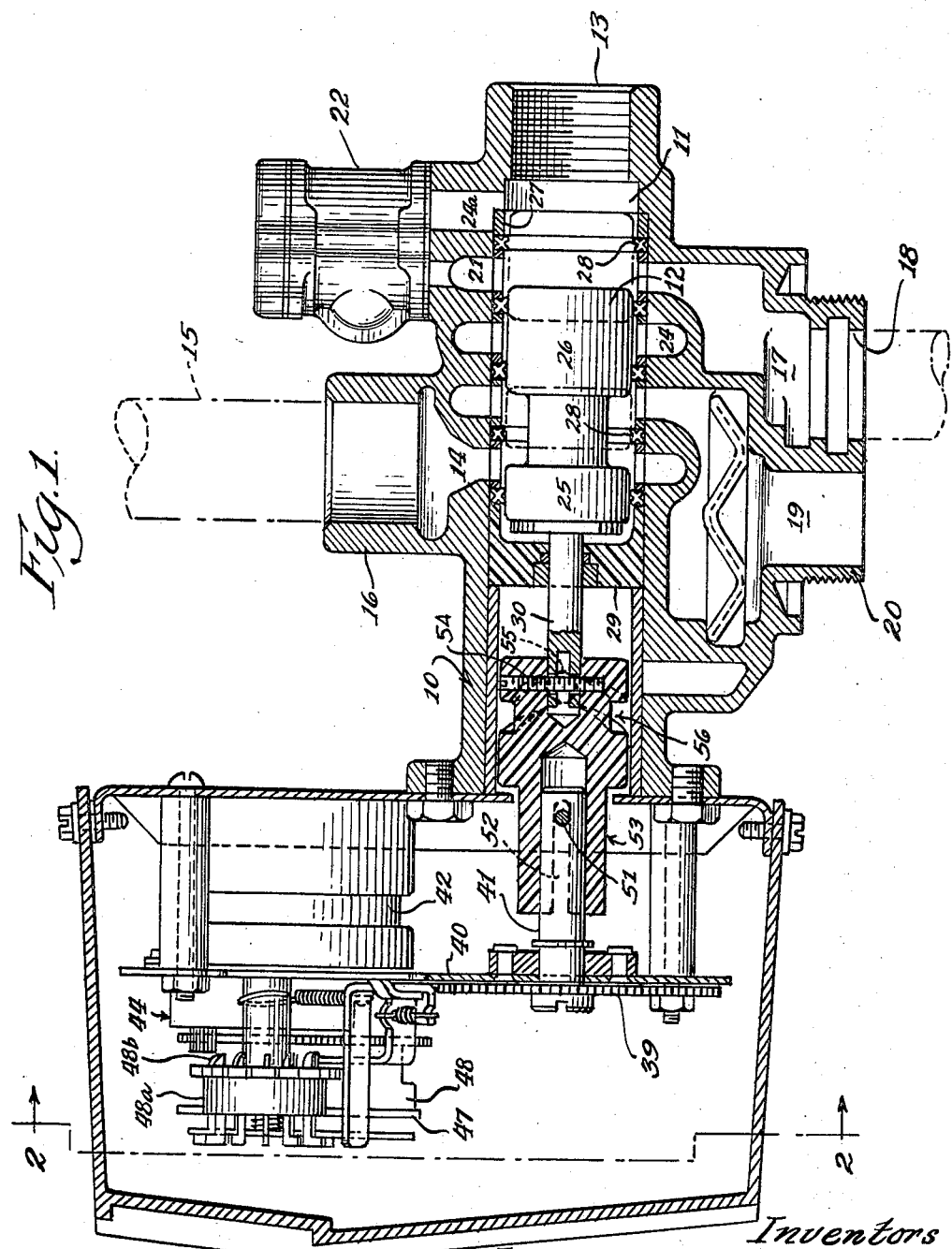
FIGURE 1 is a sectional view of a valve of the class described and illustrating valve operating mechanism utilizing a direct drive from a timing motor and illustrating a particular piston and piston rod connection.
Figure 2:
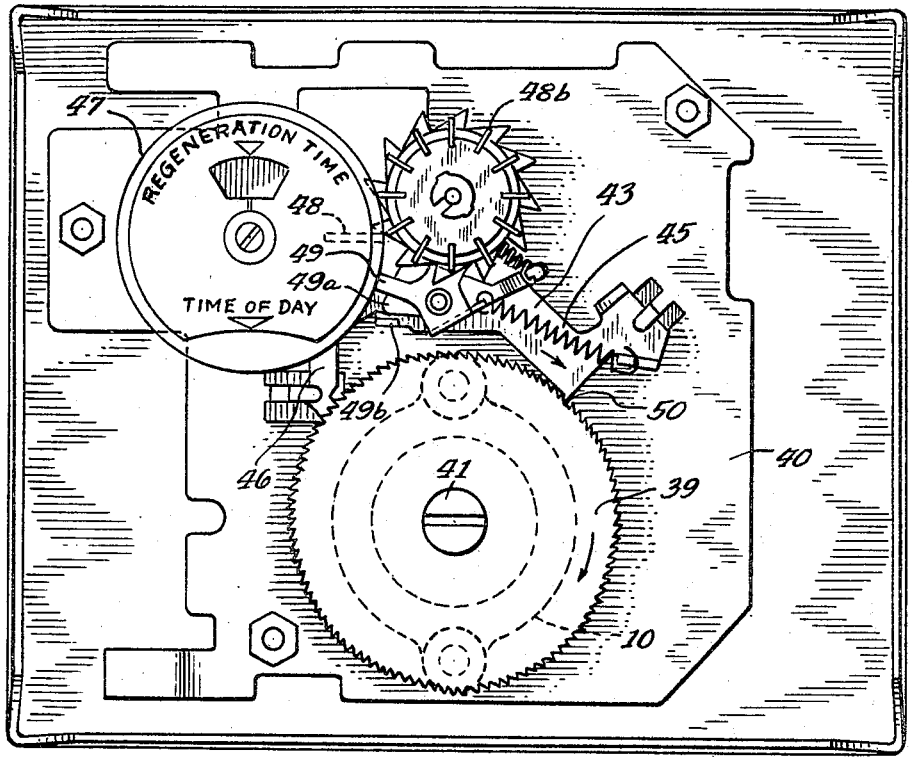
FIGURE 2 is an end view of FIGURE 1 taken on the section lines 2—2 of FIGURE 1.

With specific reference now to the drawings and in the first instance to FIGURE 1 numeral 10 designates a valve body which is formed with a longitudinal bore 11 to receive a valve operating piston 12. One end of the valve body has a port 13 therein which may lead to an inlet or hard water supply line or to an outlet for the serice line depending upon the internal arrangement of the valve. In the embodiment illustrated, the passage 13 is provided as the service outlet port. Another port 14 is spaced along the valve bore from the port 13 and in the particular embodiment shown may be used as the inlet port from a hard water supply line 15 which is coupled to a fitting 16 for this port.

The valve body also includes other ports arranged along the axial bore, as for example, the port 17 which leads through a fitting 18 which may be coupled to a pipe leading to the bottom of a softener tank. A port 19 which leads to a fitting 20 which leads to the top of a softener tank, all in such wise that in the normal service position of the valve as is illustrated in FIGURE 1, water flowing in through the inlet pipe 15 may pass between spaced lands on the valve body to the port 19 for softening by a water softening tank and after softening be returned through the port 17 to the service outlet 13. The valve body may further include another port 21 which may lead from an aspirating apparatus generally designated at 22 which is connected to a brining tank to draw brine at the proper time for regenerating the softening tank and for passage through a port 17, through the tank for backwashing, brining and rinsing and thence through a drain port 24. It should be understood that other arrangements of the various ports along the valve bore are possible within the scope of the invention. The illustration in the drawings should be taken as generally representative of the class of valve wherein in one position ot the valve, hard water is passed through the softening tank before it is passed to the service outlet while in another position of the valve hard water is bypassed directly to the service outlet, as during a regeneration period, when brine is passed to the softening tank for purposes of regenerating the same. Valves of this type characteristically include a piston formed with spaced lands 25 and 26 thereon with a recess between the lands to allow communication between adjoining ports in the valve structure.

As illustrated, the valve body includes spacer rings 27 which are spaced along the valve bore and serve to captivate resilient rubberlike quadrant seal rings 28 in a manner more fully described in our co-pending application, Ser. No. 302,669, filed on Aug. 31, 1963. The arrangement provides a clearance of on the order of thirty thousandths of an inch or so between the spacer rings and piston lands.

One end of the valve bore is closed by a partition 29 having an aperture therethrough for passage of a piston rod 30. Piston rod 30 is adapted to be reciprocated by mechanism to be hereinafter described all to shift the piston to the various operating positions at the proper sequence for the various operations of water softening and regeneration.

In accordance with the present invention, the piston 12 has a bypass passage 31 formed therethrough to allow passage of water from the inlet and directly to the service outlet when the valve is in the regenerating position, as when piston 12 is shifted to the right from the position illustrated in FIGURE 1 and to a position where piston land 25 allows flow from port 14 to the left-hand end of the bypass while closing port 19 from the port 14 and while connecting port 19 to drain port 24.

The piston is connected to the piston rod 30 in such a manner as to allow relative movement of the piston 12 with respect to piston rod 30 and to various positions to and from a position wherein the axes of the piston and piston rod are aligned. By so connecting the piston and piston rod, the piston more or less floats on the rubberlike seal rings 28 which are spaced along the axis of the valve body. Also, by providing such relative movement, the piston may tilt with respect to the piston rod and allow passage of foreign articles between the seals and the opposed piston surfaces. This minimizes possibilities of jamming the valve. This is accomplished in the present invention by loosely connecting one end of the piston with an end of the piston rod. For example, as illustrated in the drawings, the end of the piston rod 30 as designated at 32 projects into the bypass passage of the piston by a short distance. A pin 33 is loosely received within a transverse bore in this end of the piston rod 30 so that the pin may shift back and forth in directions transversely to the axis of the piston rod. A plug 34 has a bypass therethrough aligned with the bypass through the piston and is screw threaded in a counterbore 35 in this end of the piston. The inner end surface 36 of the plug is maintained at a distance from the opposed inner surface of the bore such that the pin 33 is loosely captivated therebetween. This is illustrated by the clearance illustrated in the drawings. The inward extension of the plug 34 may be limited by a flange 37 which abuts against the end of the piston. A washer 36a may bear against surface 36.

By so connecting the piston and piston rod, the piston may swing about the axis of the connecting pin 33. The piston may also tilt relative to the pin 33 by a limited amount depending upon the clearance space between the plug 34 and the pin 33. It is desirable to allow a few degrees of such tilting motion. The piston 12 may also move relative to the piston rod 30 simply by reason of the pin 33 shifting within the bore in the end of the piston rod. Such shifting can theoretically occur until the surface of the piston rod contacts the inner surface of the passage through the plug as represented at 38, except that when the piston is assembled in the valve, the spaced seal rings 28 limit the piston to a lesser degree of movement.

By providing the piston connection at one end only of the piston, the pin 33 may be subjected to the flow forces developed in the valve body, as when the piston 12 is in the regenerating position. In the service position, as illustrated in FIGURE 1, bypass passage 31 may be filled with water but this is somewhat static and provides a lesser corrosive and/or erosive effect than that developed when the inlet flow constantly passes the connection between the piston rod and piston during the normal service operation of the valve.

The drive mechanism for the valve is illustrated as applied to a valve which is adapted for up-flow regeneration of the softener tank. In up-flow regeneration, the valve has only two positions, namely, a service position and another position wherein the brining, backwashing and rinsing operations take place. In this other position, which is indicated in dotted lines in FIGURE 1, land 26 has moved to a position blocking port 24 from the outlet flow. The pressure from the outlet forces water through passage 24a of the aspirator 22 so that brine flows from port 24 to port 17 and to the bottom of the tank. In this other position, flow from the hard water inlet 14 is bypassed directly to the service outlet 13 and part of the flow from the hard water inlet passes through the aspirator 22 to pull brine from the brine tank and direct it through ports 24 and 17 and to the bottom of the softener tank to thereby regenerate the softener tank. After the flow of brine is exhausted, the same inflow of hard water in this position is used to rinse the softener tank. The flow of brine through the tank is used to backwash the softener tank. In this position the brining and rinsing water is passed from port 19 to the drain port 24.

This type of regeneration may be considered different from what is known as down-flow regeneration in which a valve is first moved to a backwash position to direct water from the hard water inlet through the softener tank and then to a drain, then moved to another position wherein hard water passes through an aspirating passage to cause a flow of brine to and through the softener tank, and then the valve is moved to another position for a rinsing of the tank.

In the particular valve mechanism illustrated herein, the valve piston is adapted for two basic positions, namely, one as illustrated in FIGURE 1 and a second position to the right of that illustrated. These two positions correspond to the two positions aforementioned.

A rotatable gear or wheel 39 is mounted on a support 40 and has a shaft 41 which is used to reciprocate the piston 12 at periodic intervals as governed by a continuously operating electric timing motor 42 and connecting mechanism. The timing motor 42 is used to drive the ratchet wheel 39 through mechanism which may be set to automatically cause a regeneration cycle once every 24 hours or other period. A pawl 43 is movably mounted on support 40 and has an end portion engaged with a cam on the shaft of one gear of the gear transmission 44 to cause a one-tooth stepping movement of the pawl in the direction of the arrow during normal operation of the timing motor 42. A spring 44 returns the pawl 43. A holding pawl 46 prevents reverse movement of wheel 39. When it is time for regeneration, as governed by the wheel 47, a plate 48 which is driven by gear transmission 44 to rotate one revolution every 24 hours on wheel 47, hits arm 49 which is pivoted on pawl 42 and displaces pawl 43 through a two-tooth stepping movement. As plate 48 approaches the pawl 49b it engages teeth on a member 48a to move it a twelfth of a revolution. Member 48a has a series of movable lugs 48b which may be used to contact arm 49 and move it out of the way of plate 48 as the plate 48 passes. By selective use of the lugs, the mechanism may be set to skip one or more days before actuating the valve. An extension 49a on arm 49 engages a portion 49b on arm 49 to give an added movement to pawl 43. At this time pawl 43 is in the dwell position which is indicated by the missing ratchet tooth as at 50. It will be realized that while the pawl has only the one-tooth stepping movement it will remain in the dwell position and not cause movement of the ratchet wheel. When the pawl is engaged for a two-ratchet tooth stepping movement, it will then engage the teeth of the ratchet wheel and cause a slow rotation of the ratchet wheel 39 so as to cause movement of the valve piston from the service position to the regeneration position and then back to the service position. Approximately three hours or so may be required to move the wheel through this one revolution and operating cycle whereupon the pawl again engages the dwell point or gap 50 on the ratchet wheel. After 24 hours or some other service time passes, the cycle is repeated.

Timing motor mechanisms as thus described have heretofore been used to drive a ratchet wheel which in turn rotates cams which operate switches to control a valve operating motor but without directly driving a valve piston.

Figure 8:
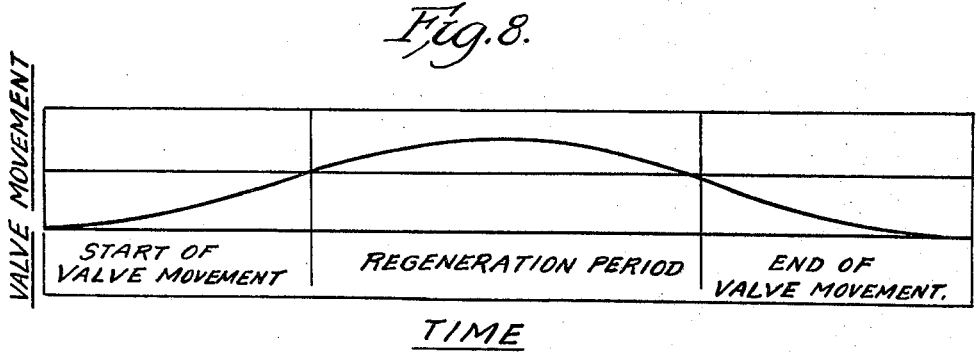
FIGURE 8 is a graph illustrating the timed movement of the valve from service position to regenerating position and back to service position during a regenerating cycle.

It will be appreciated that before the valve moves to the fully extreme position which corresponds to 180° of movement of wheel 39, which is the regeneration position, the piston will have moved sufficiently far to open and close the necessary ports for regeneration to commence. Also, as the valve starts its slow movement back to the service position, the regeneration cycle will continue for a number of minutes until the valve has changed the opening and closing of ports to the service position which is essentially the port open and closed arrangements illustrated in full lines in FIGURE 1. This is illustrated in FIGURE 8 wherein about two-thirds of the initial valve movement will start regeneration.

The motion translating mechanism between the ratchet wheel 39 and the valve operating piston rod consists of a pin 51 carried by the shaft 41 which turns with the ratchet wheel and which engages a slot 52 in a reciprocable member 53. Member 53 is reciprocably mounted in the valve body for movement along an axis aligned with the axis of the valve bore. Member 53 is connected to piston rod 30 by means of a pin 54. A lug 55 (FIGURE 5) is fixed to the valve body and projects into a continuous spiral groove 56 in member 53 so that as member 53 is rotated, the lug forces axial shifting of member 53 and the valve piston from and to the service position for the regeneration operation. One revolution of member 53, as produced by one revolution of wheel 39, will produce the movement of piston 12 all the way to the right from the position of FIGURE 1 and then back to the position of FIGURE 1. Even though member 53 rotates, piston 12 will not because of the piston rod connection of FIGURE 6.

Since the movement of the valve through the regeneration cycle makes use of a series of small and slowly occurring incremental steps, it is possible to use an extremely small and inexpensive motor both for timing purposes and for purposes of providing the driving force for the valve. In this regard, it may be appreciated that if motor 42 operates at 60 revolutions per second, while pawl 43 is displaced through a one-tooth stepping movement only every approximately minute and one-half, many hundreds of revolutions of the motor are used to provide the power to advance the valve piston through only a fraction of an inch.

The particular motion translating mecahnism is highly effective in translating the rotary movement of the ratchet wheel into corresponding incremental movements of the valve piston.

The particular piston connection along with the quadrant sealing rings, as herein disclosed, cooperate to minimize the operating forces which are required to move the valve piston. The particular piston and piston rod connection may, of course, be used in valve environments other than as disclosed herein, with the attendant advantages of ease of installation and low operational force.

By having the piston 12 more or less loosely mounted on the piston rod, the piston 12 may tilt slightly from time to time relative to the piston rod. This is particularly advantageous in connection with seal rings of the type disclosed, since such tilting of the piston may allow particles of sand or other foreign matter to pass the seal rings and pass into the valve without jamming the valve.

Whereas we have shown and described an operative form of the invention, it should be understood that this showing and description thereof should be taken in an illustrative or diagrammatic sense only. There are many modifications in and to the invention which will be apparent to those skilled in the art and which will fall within the scope and spirit thereof. The scope of the invention should be limited only by the scope of the hereinafter appended claims.

We claim:

1. A water softener of the time-controlled type including a piston type valve having a piston reciprocably mounted in the valve for controlling flow through the valve for service and regeneration operations, a continuously operated timing motor and rotary means periodically and mechanically driven by said timing motor for causing movement of said piston, a reciprocable driving element connected to said rotary means so as to be rotated by said rotary means, said element having a spiral groove engaging a camming element whereby rotation of said element is accompanied by linear movement of said element, said element having a rod with a pin at one end thereof connected to said piston, said pin being connected to allow relative rotary movement between said piston and said rod whereby upon rotary and linear movement of said element, under influence of said timing motor and rotary means, said piston is moved axially within said valve bore.

2. The structure of claim 1 wherein said rotary means includes pawl and ratchet means operable by said timing motor to periodically cause rotation of said element.

References Cited

UNITED STATES PATENTS

| 1,758,645 | 5/1930 | Betts | 251—86 X |
| 1,648,124 | 11/1927 | Hopkins | 251—86 X |
| 1,925,109 | 9/1933 | Olson | 137—625.48 X |
| 2,479,688 | 8/1949 | Lindgren | 251—86 |
| 2,579,642 | 12/1951 | Bachman | 74—57 X |
| 2,989,988 | 6/1961 | Rudlick | 210—138 X |
| 3,073,346 | 1/1963 | Rudlick | 137—624.13 |
| 3,248,493 | 4/1966 | Bassett | 200—39 |
| 3,237,640 | 3/1966 | Whitlock | 137—624.18 X |

ALAN COHAN, Primary Examiner

U.S. Cl. X.R.

137—625.29, 625.34; 210—138